(12) United States Patent
Melamed

(10) Patent No.: US 11,977,643 B2
(45) Date of Patent: May 7, 2024

(54) METHODS AND SYSTEMS OF A SOFTWARE-BASED SOLUTION FOR AUTONOMOUS APPLICATION SECURITY TESTING OF CLOUD-NATIVE APPLICATIONS

(71) Applicant: Tal Melamed, New Haven, CT (US)

(72) Inventor: Tal Melamed, New Haven, CT (US)

( * ) Notice: Subject to any disclaimer, the term of this patent is extended or adjusted under 35 U.S.C. 154(b) by 0 days.

(21) Appl. No.: 17/460,292

(22) Filed: Aug. 29, 2021

(65) Prior Publication Data
US 2022/0147637 A1 May 12, 2022

Related U.S. Application Data

(60) Provisional application No. 63/198,071, filed on Sep. 28, 2020.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .... G06F 21/577; G06F 9/44589; G06F 11/36; G06F 2221/033; G06F 2221/034
See application file for complete search history.

(56) References Cited

U.S. PATENT DOCUMENTS

| | | | |
|---|---|---|---|
| 10,733,074 B1 * | 8/2020 | Cok | G06F 11/3608 |
| 2018/0143891 A1 * | 5/2018 | Polisetty | G06F 9/542 |
| 2019/0332366 A1 * | 10/2019 | Natanzon | G06F 11/3696 |
| 2020/0265144 A1 * | 8/2020 | Gwilliams | G06F 11/3684 |

* cited by examiner

*Primary Examiner* — Daniel B Potratz

(57) ABSTRACT

In one aspect, a method includes the step of providing a cloud-platform based application. The method includes the step of providing a manager Lambda function. With the manager Lambda function, the method scans the cloud-platform based application, and obtains a set of metadata about the cloud-platform based application. The method includes the step of using the set of metadata. The method includes the step of generating a testing profile in a templated format based on a type of application of the cloud-platform based application. The method includes the step of using the testing profile to exercise the cloud-platform based application with one or more security testing operations.

8 Claims, 12 Drawing Sheets

METHODS AND SYSTEMS OF A SOFTWARE-BASED SOLUTION FOR AUTONOMOUS APPLICATION SECURITY TESTING OF CLOUD-NATIVE APPLICATIONS

CLAIM OF PRIORITY

This application claims priority to U.S. Provisional Patent Application No. 63/198,071, filed on Sep. 28, 2020, and titled SOFTWARE-BASED SOLUTION FOR AUTONOMOUS APPLICATION SECURITY TESTING OF CLOUD-NATIVE APPLICATIONS. This application is hereby incorporated by reference in its entirety.

BACKGROUND

Standard Dynamic Application Security Testing (e.g. DAST and IAST) solutions are only based on application programming interface (API) protocols (e.g. REST). As a result, DAST solutions scan applications from their externally access points (e.g. API endpoints) and cannot scan applications which are not connected to the network. In other words, standard IAST and DAST solutions rely on applications with accessible API endpoints in order to be able to scan them. Problematically, cloud-native applications include code that is invoked in ways other than internet API protocols, and so cannot be assessed by standard IAST and DAST solutions. Furthermore, all current Application Security Testing tools heavily depend on manual or semi-manual configurations.

SUMMARY OF THE INVENTION

In one aspect, a method includes the step of providing a cloud-platform based application. The method includes the step of providing a manager Lambda function. With the manager Lambda function, the method scans the cloud-platform based application, and obtains a set of metadata about the cloud-platform based application. The method includes the step of using the set of metadata. The method includes the step of generating a testing profile in a templated format based on a type of application of the cloud-platform based application. The method includes the step of using the testing profile to exercise the cloud-platform based application with one or more security testing operations.

Figure 1:
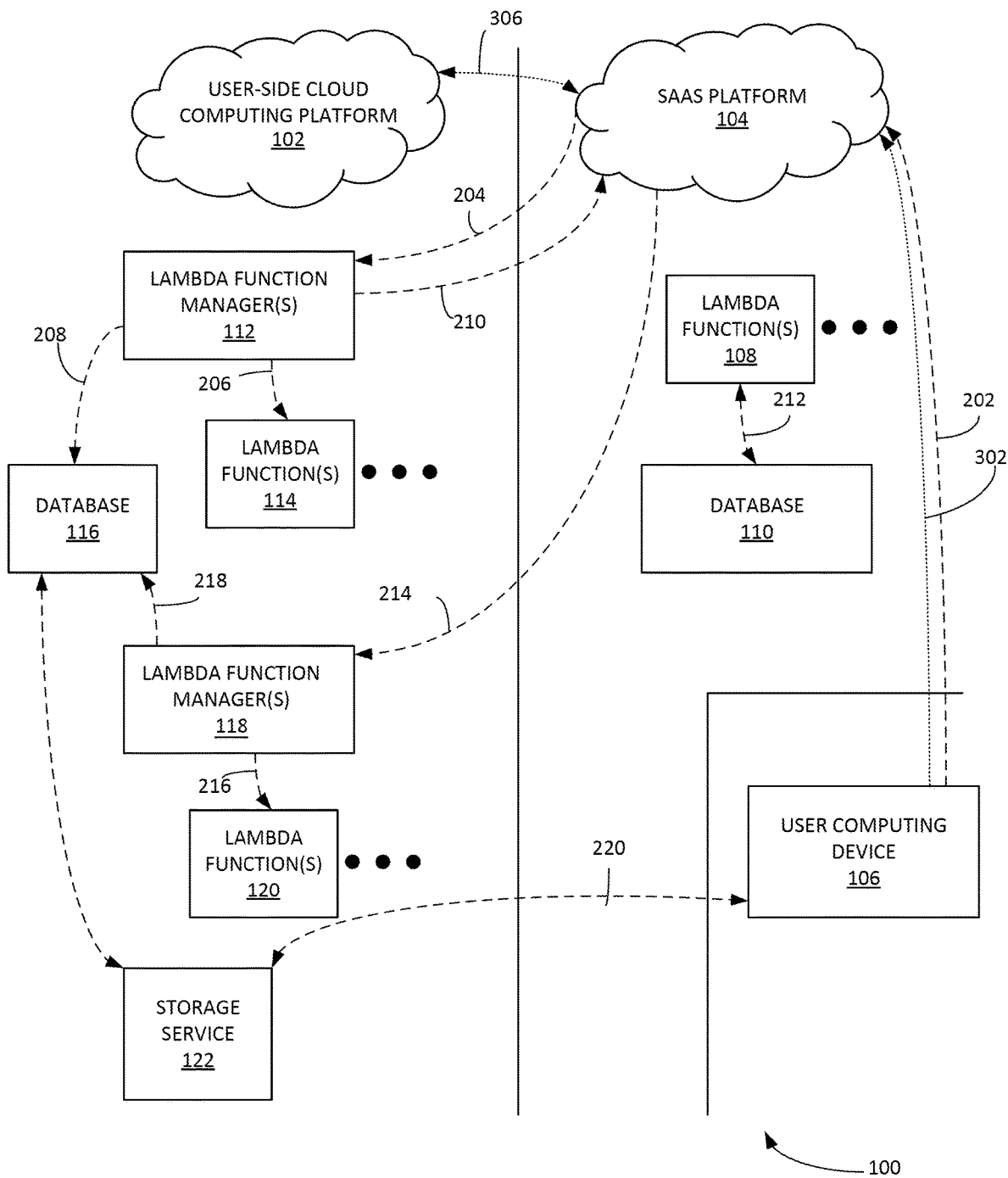
FIG. 1 illustrates an example system for implementing a software-based solution for autonomous application security testing of cloud-native applications, according to some embodiments.

The Figures described above are a representative set and are not an exhaustive with respect to embodying the invention.

DESCRIPTION

Disclosed are a system, method, and article of manufacture of a software-based solution for autonomous application security testing of cloud-native applications. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment;' 'an embodiment,' 'one example,' or similar language means that a particular feature, structure, or characteristic described in connection with the embodiment is included in at least one embodiment, according to some embodiments. Thus, appearances of the phrases 'in one embodiment;' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

AWS Lambda is a serverless compute service that enables a user to run code without provisioning or managing servers, creating workload-aware cluster scaling logic, maintaining event integrations, or managing runtimes. AWS Lambda enables a user to run code for an application, backend service, etc.

Dynamic application security testing (DAST) tool can be a program which communicates with a web application through the web front-end in order to identify potential security vulnerabilities in the web application and architectural weaknesses. DAST can perform a black-box test.

Dynamo is a set of techniques that together can form a highly available key-value structured storage system or a distributed data store. It has properties of both databases and distributed hash tables (DHTs).

Amazon® DynamoDB is a fully managed proprietary NoSQL database service that supports key-value and document data structures.

Lambda function can be a an anonymous computing function, not bound to an identity. Each Lambda function can run in its own isolated environment, with its own resources and file system view. In some examples, application code that is run in AWS Lambda can be a Lambda function. Each Lambda function can have associated configuration information (e.g. Lambda function name, Lambda function description, Lambda function entry point, Lambda function resource requirements, etc.). The Lambda function code can have a stateless style in that there is no affinity to the underlying compute infrastructure. Local file system access, child processes, and similar artifacts may not extend beyond the lifetime of the request, and any persistent state can be stored (e.g. in an Internet-available storage service). Lambda functions can include libraries.

Representational state transfer (REST) is a software architectural style that was created to guide the design and development of the architecture for the World Wide Web. REST defines a set of constraints for how the architecture of an Internet-scale distributed hypermedia system may behave.

Software as a service (SaaS) is a software licensing and delivery model in which software is licensed on a subscription basis and is centrally hosted.

Amazon S3® (S3) is a service offered by Amazon Web Services (AWS) that provides object storage through a web service interface. S3 uses the same scalable storage infrastructure that Amazon.com uses to run its global e-commerce network.

Example Methods and Systems

Example embodiments relate to serverless and cloud-native applications and, more particularly, a software-based solution for Cloud Application Security Testing (CAST) of cloud-native applications. Using research and cloud-platform meta-data, the CAST systemic can adapt software to profile and scan cloud-native applications. The cloud-native applications can include non-API-based functions, cloud containers, etc. The CAST system can provide accurate results by interacting with the cloud-platform environment to collect meta-data and logs. The data collected from the cloud-platform environment (e.g. meta-data and logs) can enable the CAST system software to automatically identify changes and the configurations made to the cloud-platform resources. They can then be used to programmatically and autonomously configure and launch the security testing without the need of manual or semi-manual configurations and interactions with the software.

The CAST system can provide automated security testing for serverless application. In some examples, the serverless components can be an AWS Lambda function. The Lambda function can be a compute service that executes application code/logic without need for provisioning underlying infrastructure. The CAST system can receive runtime information for the application code to be executed as a code as a service. The CAST system can enable organizations to develop fast because they do not need to manage infrastructure and how/when to run the code. The CAST code can automatically be scaled by AWS (and/or a similar type of cloud-platform service). This can be applied when there is no parameter accessed via a network interface/protocol as a lambda function can be accessed via an API, etc. The CAST system can upload file to a different service to access code and not always in a synchronous request/response behavior. The CAST system can be used to automate the security testing process for lambda functions no matter which service it is interacting with. This can be implemented without determining context of the events/processes operating in the specified cloud-computing platform of the source code. The CAST system be used to avoid a lot of false positives and unknowns for static code analysis. For dynamic code analysis, the CAST system do not need to rely on a front-end URL to beginning scanning from. However, as service-level applications do not have URLs, the present methods and systems can still be implemented.

FIG. 1 illustrates an example CAST system 100 for implementing a software-based solution for autonomous application security testing of cloud-native applications, according to some embodiments. User-side cloud computing platform 102 and SaaS platform 104 can both run on an AWS cloud-platform (and/or similar type system such as, inter alia: Microsoft Azure®, etc.) and each platform can be communicatively connected. In this way, the application code, infrastructure, etc. can be scanned. Application flows, relationships between various entities and services, etc. can also be scanned. After the scan, CAST system 100 can obtain the relevant metadata. Metadata can include, inter alia: the services the Lambda function (e.g. Lambda functions 108, 114, and/or 120, etc.), identities of entities the Lambda function interact with/communicate with, permissions of the Lambda functions, what flows in code that were discovered (e.g. code performs a read and passes this information to another service, etc.), flows in the code, etc. Based on all this metadata information, a profile is generated. The profile can be in a templated format. Then, the profile is then used to exercise the code with security testing.

Additionally, Lambda functions 108, 114, and/or 120 can be the same Lambda functions performing more than one step in a various embodiments.

It is noted that a Lambda manager can be a Lambda function provided to operate within the user-side cloud computing platform 102 to implement the application security testing Lambda functions from within said platform/system. For example, Lambda managers 112 and 118 can implement processes 200 and 300. In this way, system 100 does not need to perform intrusive activities (e.g. scanning by removing code to a backend or running code from a outside backend, etc.). Lambda managers 112 and 118 can perform intrusive operations from within the user-side cloud computing platform 102 itself such that sensitive information is not sent outside of the platform. In this way, permissive access need not be given to external entities as well.

Lambda managers 112 and 118 can connect to the customer's account and then scan lambda functions and their respective configurations, inputs, and outputs. In this way, an understanding can be developed of, inter alia: the application code and the services interacting with the application code, configurations of the code, outputs of the code. Lambda managers 112 and 118 can create a templated profile of the code based on the understanding the application code. This profiled template can then be used to scan the code. Scanning operations can include exercising code with a set of security testing protocols that match to the specified template of the profile. Security testing can be specified for the lambda function as each lambda function has a different configuration.

An example implementation is now discussed. User-side cloud computing platform 102 can be operatively associated with the following systemic components: a user cloud account (e.g. a user-side cloud computing platform 102 such as an AWS account) with compute resources (e.g. Lambda functions 108, 114, etc.); a SaaS platform 104; a systemic license; a DAST serverless resources (e.g. Lambda functions 108, 114, etc.); one or more scan requests using the SaaS platform 104; an initial scan of user's cloud account using cloud APIs; one or more software profiles 8 user resources using cloud APIs; software-collected meta-data on resources; a generated a scan profile using prior research (IP); scanning the user's compute cloud resources using cloud APIs CAST software; and one or more reports of identified security issues in the user's cloud resources generated by the CAST software.

Using the user computer device 106, the user connects to the SaaS platform 104 and purchases a systemic license to use the systemic software. The user is then redirected to his cloud account where he has cloud resources clicks to install additional resources. From that moment, the user can request a CAST scan of his serverless resources on-request using the SaaS platform. Upon request, the system triggers the profiling of the user's resources using Cloud-APIs by invoking the DAST resources deployed in the user's account. These DAST functions profile the existing serverless resources of the user, using Cloud-APIs and send back meta-data about those resources. In embodiments, based on research, the SaaS platform may be adapted to generate a scan profile for each of the requested serverless resources. The SaaS platform 104 then invokes the DAST functions deployed by the DAST serverless resources on the user cloud account with serverless resources. The DAST serverless resources then uses cloud-APIs to invoke existing user cloud account with the generated scan profile provided received from the SaaS platform 104 to perform a DAST scan of the user's serverless resources. The DAST serverless resources generate a report of all security issues that were identified during the scan.

In some examples, upon request, the software connects to the inventor's DAST resources, deployed on the user's cloud account using cloud-platform based APIs (i.e. cloud-APIs). The DAST resources execute code (e.g. using the cloud-APIs) that collects and sends back meta-data about the requested serverless resources. The systemic software generates a scan profile that is based on the scanned-resource's event-type (e.g. the way it is triggered) and sends it back to the inventor's DAST functions deployed on the cloud account. The DAST resources then scans the requested resources, using the scan-profile and code.

In one example, once the set-up is complete and a scan is requested by the user on the inventor's SaaS platform, the DAST resources deployed in the customer account collects meta-data about the user's serverless resources using Cloud-APIs. Part of the collected meta-data on each resource is the type of event that triggers it. There are X types of events that can execute code. For each event-type a designated profile will be created. The profiling may be sent to the DAST functions to perform the actual scan using cloud-APIs.

In the given example part of the systemic software is deployed on the user's cloud account. Where in practice the systemic software can be installed on both the user and the inventor's cloud account and function in the same way. This can enable flexibility to users who do not want to communicate with other accounts or that do not wish to install resources on their account. Processes 200 and 300 (as well as other processes provided herein) can be implemented using CAST system 100.

The user computing device 106 and the operatively associated systemic components disclosed above may be provided. The user can identify practical security issues in his serverless application(s). Various interactions with the software are internet-based through the cloud account or using internet-APIs (e.g. REST).

Additionally, system 100 can used to create a security report about the scanned serverless resources: which of them is vulnerable, how, what risk, how to mitigate the risk, etc. System 100 include databases 110 and 116 (optional). A storage service 122 (e.g. S3 in AWS, etc.) is available. Storage service 122 takes results and provides these to the user. In other embodiments, this can be from an API, other cloud-storage service, etc. It is noted that database 116 can be replaced by sending the metadata/information to an external backend server in some examples. Likewise, storage service 122 can be removed and the metadata sent back to a backend server. The user computing device 106 can then access the results via an API and/or dashboard.

Figure 2:
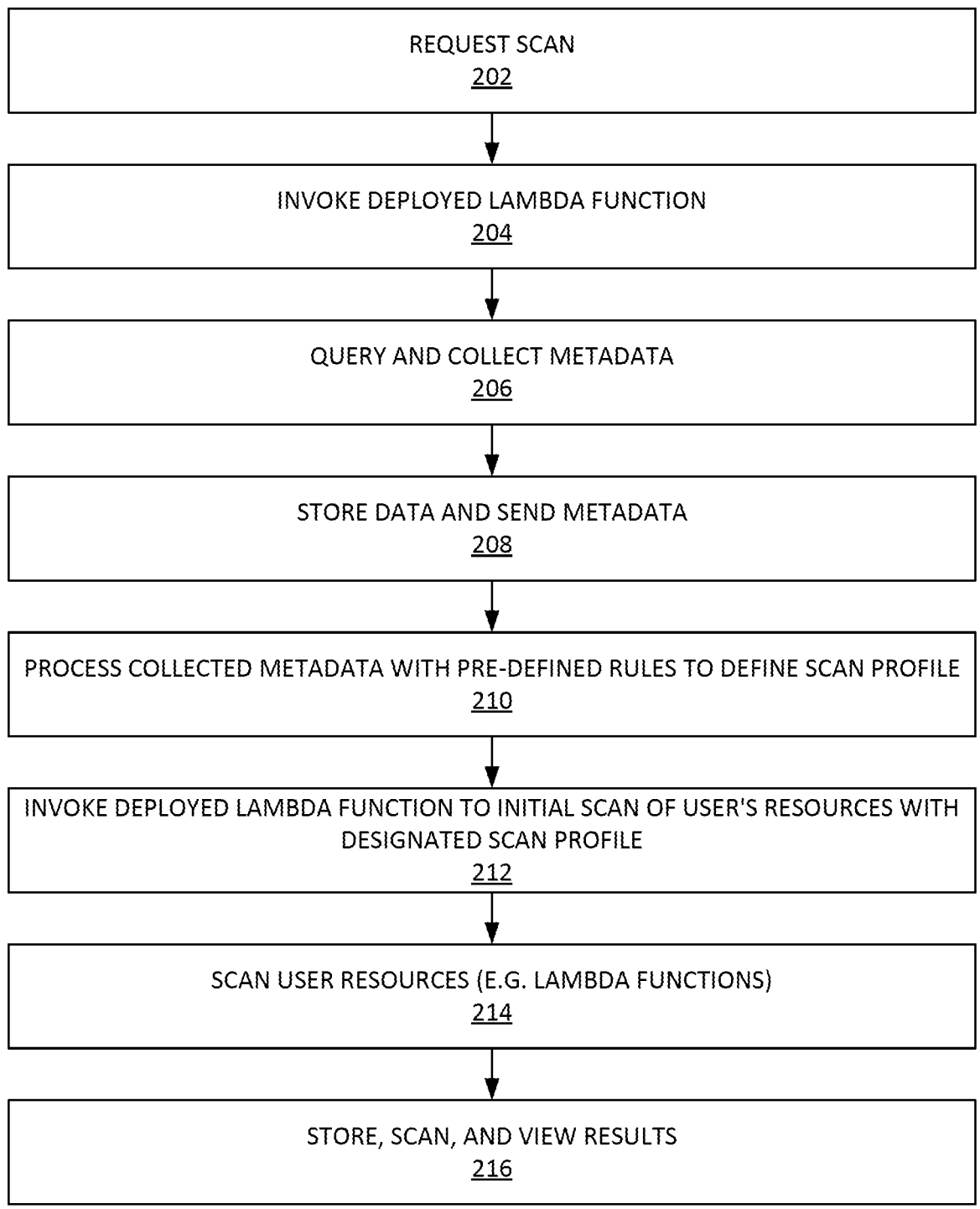
FIG. 2 illustrates an example process for implementing a software-based solution for autonomous application security testing of cloud-native applications, according to some embodiments.

FIG. 2 illustrates an example process 200 for implementing a software-based solution for autonomous application security testing of cloud-native applications, according to some embodiments. In step 202, process 200 can request a scan. In one example a user can request scan. In another example, this can be an automatic/autonomous scan e.g. when code or configuration in Lambda function changes. This can trigger process 200 automatically with a user request as well.

In step 204, process 200 can invoke a deployed lambda function. In step 206, process 200 can query and collect metadata. In step 208, process 200 can store data and send metadata. In step 210, process 200 can collect the metadata with pre-defined rules an define a scan profile. In step 212, process 200 can invoke a deployed lambda function to an initial scan of user's resources with a designated scan profile. In step 214, process 200 can scan the user resources (e.g. lambda functions). In step 216, process 200 can store, scan, and enable the viewing of the results.

Figure 3:
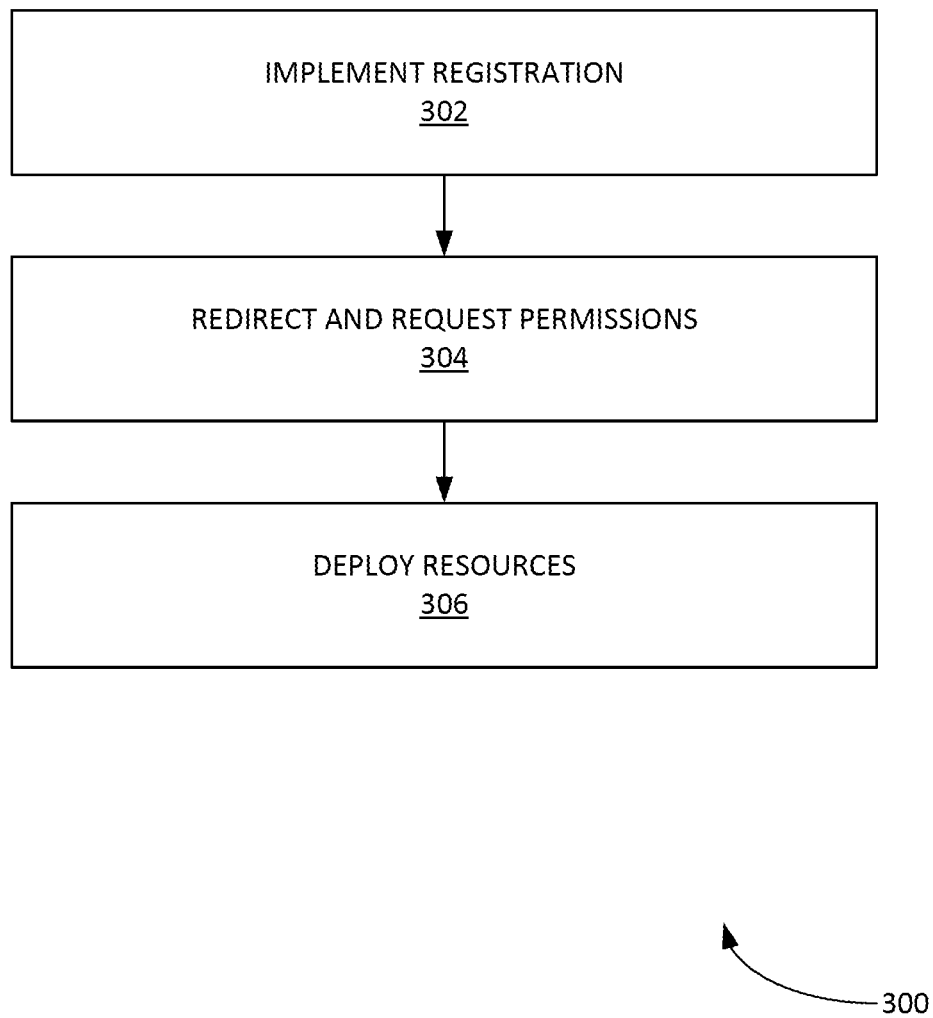
FIG. 3 illustrates an example process during automated security testing for serverless applications, according to some embodiments.

FIG. 3 illustrates an example process 300 during automated security testing for serverless applications, according to some embodiments. Process 300 can handle registration to the services provided by FIGS. 1-2 during an onboarding process. Process 300 can manage installation of Lambda functions. In step 302, process 300 can implement a registration process. In step 304, process 300 can redirect and request permissions (e.g. of the components of FIG. 1 such as, inter alia: the various Lambda functions, databases, storage services, etc.). In step 306, process 300 can deploy the desired resources. This can be inside a customer account and/or provide access to a backend system/server using a Lambda manager in one of the cloud-computing platforms of FIG. 1.

Referring to FIGS. 4-11, various alternative embodiments may embody a completely automated solution right now which does not require explicit scan requests. But rather, the system identifies the new code and/or configuration and automatically understands what and when a new scan is required. Moreover, registration is not required. In general, the flow is as follows. The user pushes code to the environment. The platform automatically identifies the new code/configuration and performs a security assessment on that specific code/flow. The user receives the security bug and pushes fix to the environment. The system automatically identifies the change and re-assess. Various permutations of these steps can be recurring and the entire process can be continuous.

Figure 4:
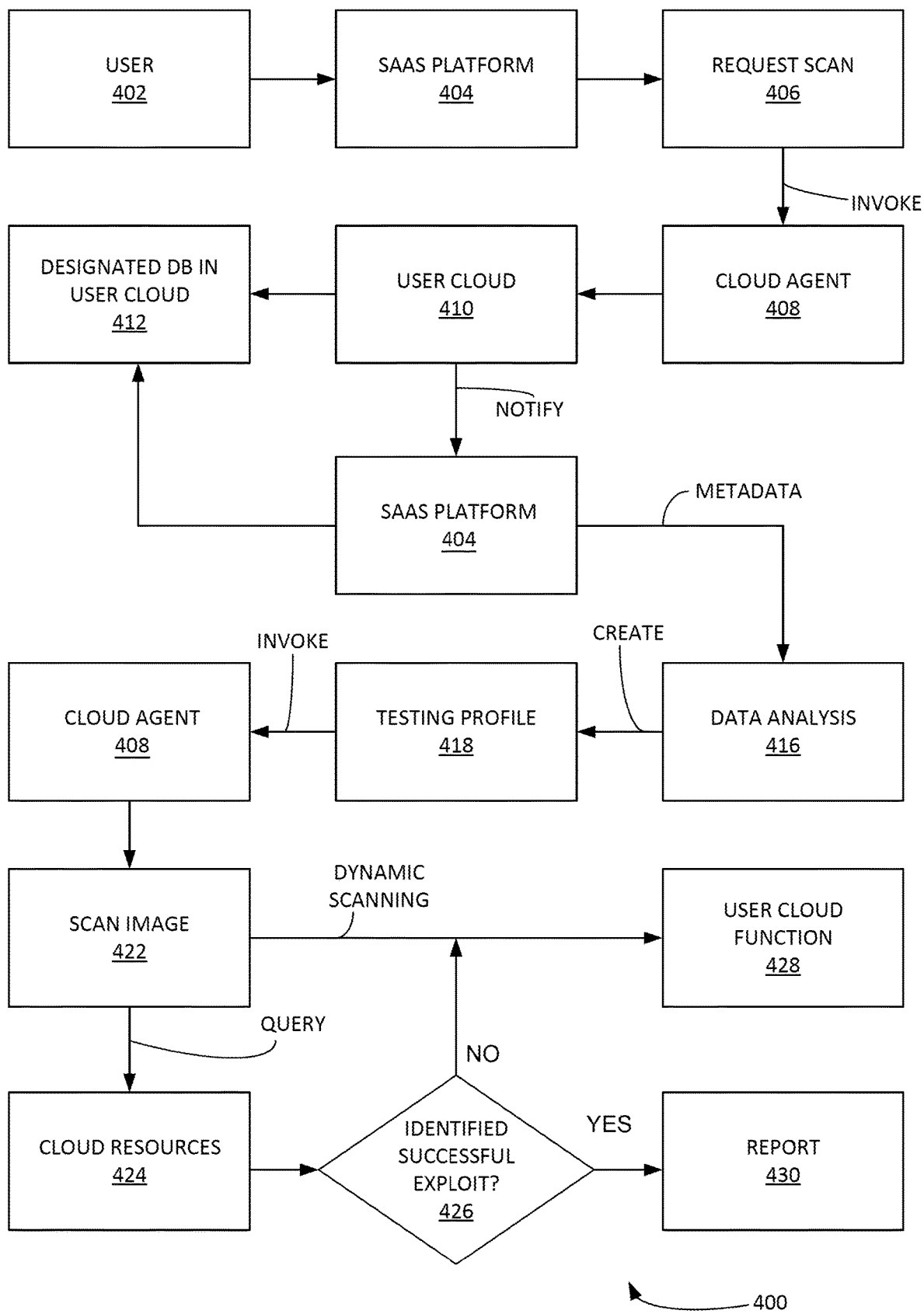
FIG. 4 illustrates an example process 400 for autonomous application security testing, according to some embodiments.

FIG. 4 illustrates an example process 400 for autonomous application security testing, according to some embodiments. The user 402 (e.g. a user-side computing system) can log into SaaS platform 404 of the system performing the autonomous application security testing and select a resource to be scanned 406. As an alternative, the user 402 deploying code to own their own environment (e.g. user cloud 410 including a designated database 412 in user cloud, etc.). This action automatically notifies the security testing environment. This also initiates a scan 406.

Invoke can be a way to communicate with the Lambda function that is deployed in the customers account (e.g. Lambda managers, etc.). For example, the cloud-agent 408 can be a Lambda manager. From an AWS backend account, invoke can be used as an AWS term to execute code. At this point, the application security testing code can be executed inside the customer's AWS account. However, it is noted that this can be from a backend AWS account managed by the entity performing application security testing. This implements the queries. The resources (e.g. functions, lambda functions, configurations, APIs, database, other entities that communicates with the specified Lambda functions, etc.) are queried. This information is stored in a specified database (e.g. a user-cloud based database 412, a database of the entity performing application security testing, etc.). The metadata is collected in this way. It is noted that the metadata may not include actual code snippets. The data analysis 416 is performed on the metadata.

The cloud-agent 408 can scan a testing image 422 and query cloud resources 424. The cloud-agent 408 has a scan engine that performs security testing. This adds malicious content/payloads into the template. The scan engine exercises the code with the malicious content/payload inputs.

The scan engine can also perform dynamic scanning of the user cloud function 428. It is noted that that process 400 can access a user's cloud-platform to not only obtain the information to generate a specific testing profile but can also explore the user's cloud-platform for additional information. This can include exploring this environment to observe events that may occur when the testing occurs. Process 400 can scan and/or attack a specified application code and the dynamically scan the cloud-platform environment to determine if a corresponding exploited vulnerability event occurred. For example, a database can be tested during s the testing profile. Process 400 can then also query the database to determine if it was also able to modify the database. In another example, process 400 can attempt to write an a file without permission as part of the testing. Process 400 can then determine if the file was indeed written due to the access it was within the user's cloud platform.

A testing profile 418 of the Lambda functions is created from the metadata. Process 400 can determine if it has identified successful exploit 426. If yes, process 400 can generate report 430.

The profile is templated for use by the type of system/protocols utilized by the each individual lambda functions. For example, when the incoming metadata is based on a database service then the data structure mimics and/or is a format used when a database calls code of the Lambda function. In another example, when the incoming metadata is based on an Amazon Alexa® service (e.g. an Alexa dot, etc.) then the format that executes the Lambda function code is different than that of the database call code example. Accordingly, the profile utilizes a template that fits the actual configuration flows of the Alexa® service. In this way, the testing profile is generated. The testing profile is sent to the cloud-agent (e.g. a Lambda manager, etc.).

Figure 5:
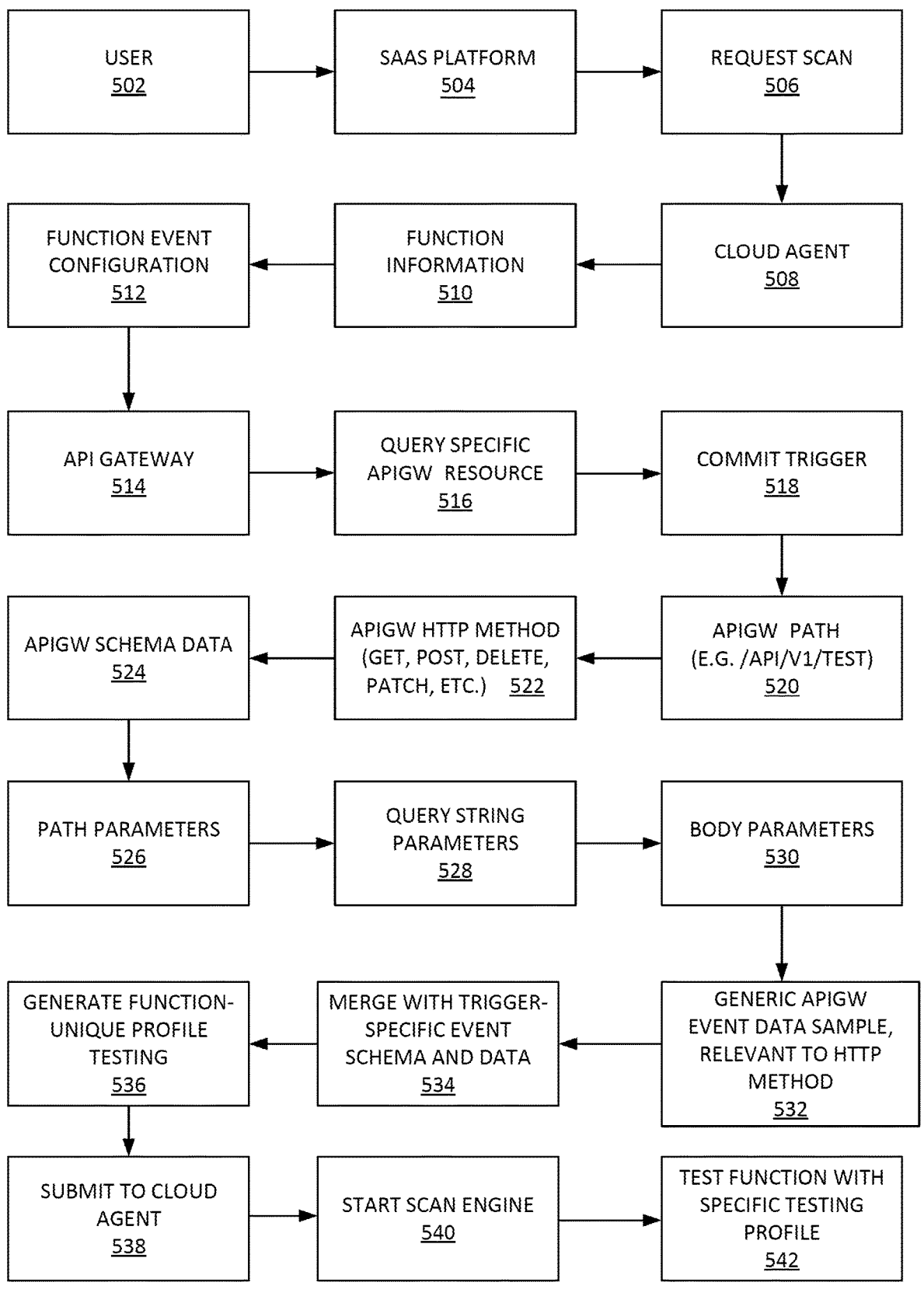
FIG. 5 illustrates an example process for autonomous application security testing with an API gateway (APIGW), according to some embodiments.

FIG. 5 illustrates an example process 500 for autonomous application security testing with an API gateway (APIGW), according to some embodiments. The user 502 can log into SaaS platform 504 of the system performing the autonomous application security testing and select a resource to be scanned 506. This can also be the result of an automatic discovery process. Function information 510 and function event configuration 512 (e.g. type of trigger that runs the code, etc.) can be obtained using API gateway 514 (e.g. a REST API call, etc.). Process 500 can query specific APIGW resource 516 to confirm this and obtain specific configuration (e.g. path to API, types of inputs, HTTP method that calls functions, structure of data that function expects, path/body/query parameters, etc.). This can be performed by the cloud agent 508.

A commit trigger 518 can be implemented and an APIGW path 520 (e.g. /API/v1/test). An APIGW HTTP method (e.g. get, post, delete, patch, etc.) 522 can be utilized. APIGW schema data 524 can be obtained as well. Process 500 can query string parameters 528 and body parameters 530. Process 500 can provide a generic APIGW event data sample and relevant to HTTP method 532. Process 500 can merge these with trigger specific event schema and data 534 (e.g. by combining the generic structure of the data with the collected information, etc.). Process 500 can then generate a unique function profile for testing in step 536. Process 500 can submit this to the cloud agent 538. Cloud agent 538 can have a scanning engine 540. Process 500 can start scan engine 540 that uses the template with a security-testing engine to attempt to exploit the function based on its own specific configuration. Accordingly, process 500 can implement a test function with specific testing profile 542.

Figure 6:
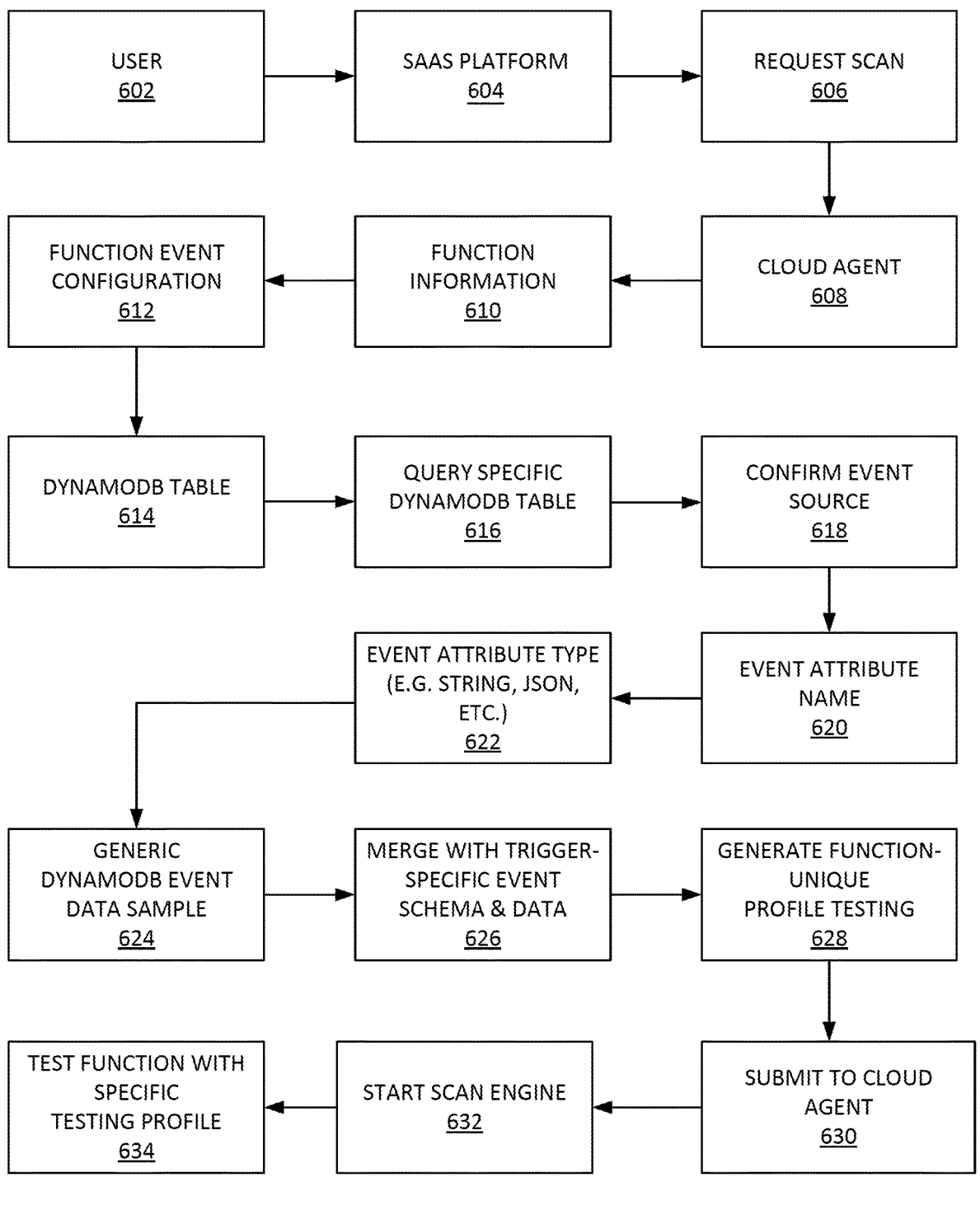
FIG. 6 illustrates an example process for autonomous application security testing with a Dynamo DB, according to some embodiments.

FIG. 6 illustrates an example process 600 for autonomous application security testing with a Dynamo DB, according to some embodiments. Process 600 can use a predefined and generic Dynamo database (DB) sample. The user 602 can log into SaaS platform 604 of the system performing the autonomous application security testing and select a resource to be scanned 606. A cloud-agent 608 can be used to obtain the function information 610 and function event configuration 612. A Dynamo DB table can be generated in step 614. Process 600 can query the specific dynamo DB table in step 616. In step 618, process 600 can confirm relevant event sources. Process 600 can determine the event attribute name 620 and event attribute type (e.g. string, JSON, etc.) 622. Process 600 can use this information to generate a generic dynamo DB event data sample 624. This can be merged with a trigger specific event schema and data 626. In step 628, process 600 can generate function unique profile for testing. In step 630, process 600 can submit this to cloud agent 608. In step 632, process 600 can start the scan engine. In step 634, process 600 can implement a test function with the specific testing profile. When process 600 scans a function that is connect to DB, the data that is expected by the code is suitable by the DynamoDB event.

Figure 7:
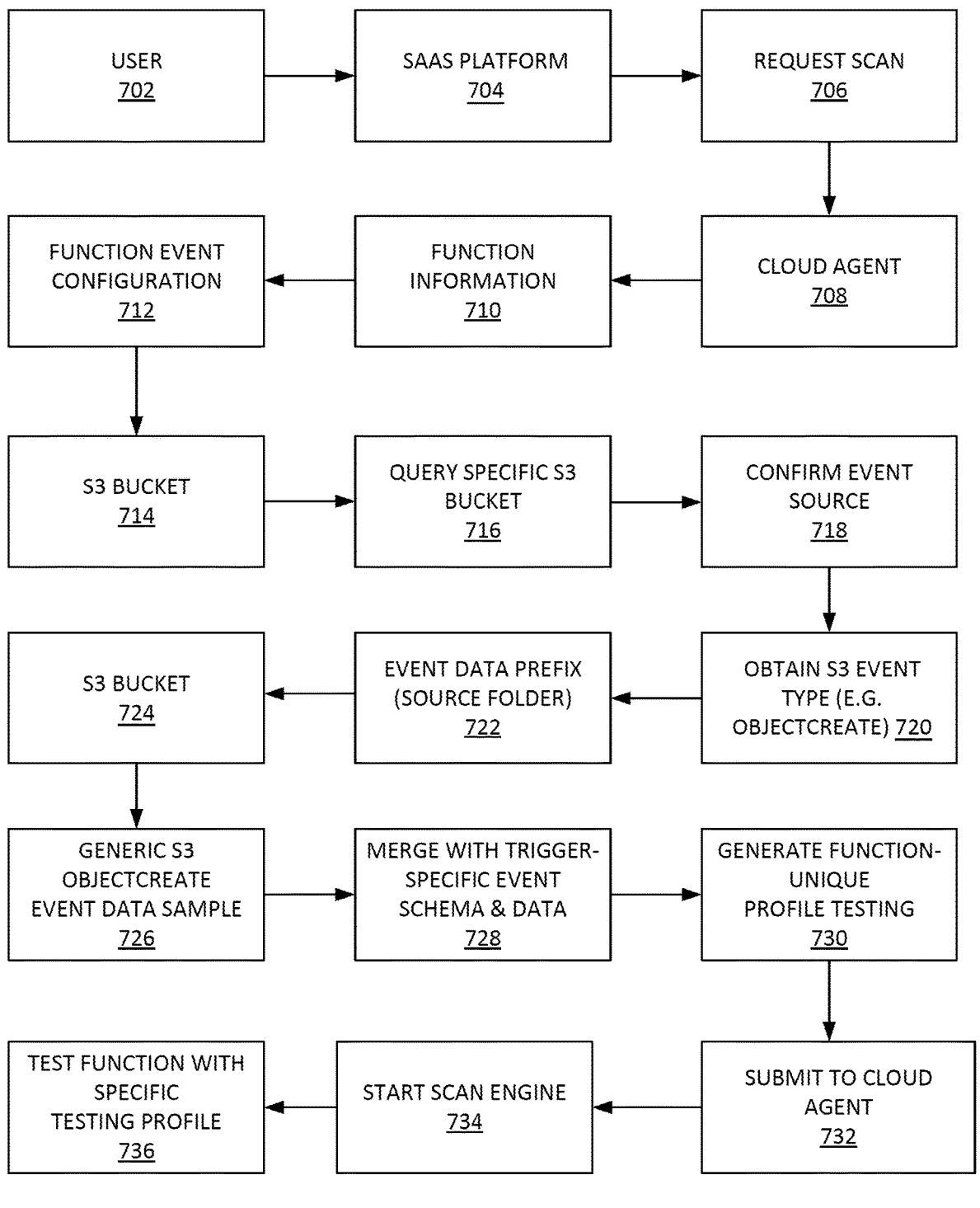
FIG. 7 illustrates an example process for autonomous application security testing with an S3 bucket, according to some embodiments.

FIG. 7 illustrates an example process 700 for autonomous application security testing with an S3 bucket, according to some embodiments. The user 702 can log into SaaS platform 704 of the system performing the autonomous application security testing and select a resource to be scanned 706. A cloud-agent 708 can be used to obtain the relevant metadata. This can be stored in an S3 bucket 714. In step 716, process 700 can query specific S3 bucket. in step 718, process 700 can confirm event source. Process 700 can obtain S3 event type (e.g. object create) in step 720. An S3 event type can be an event that occurs in the storage that triggers the code. Process 700 can obtain an event data prefix 722 (e.g. a source folder, file extensions that are expected, etc.). Process 700 can combine S3 bucket profile with a pre-defined data structure in step 724. In step 726, process 700 can also use a generic S3 object to create event data sample 726. In this way, the function can be tested with malicious content.

This can be merged with a trigger specific event schema and data 728. In step 730, process 700 can generate function unique profile for testing. In step 732, process 700 can submit this to cloud agent 708. In step 734, process 700 can start the scan engine. In step 736, process 700 can implement a test function with the specific testing profile previously developed.

Figure 8:
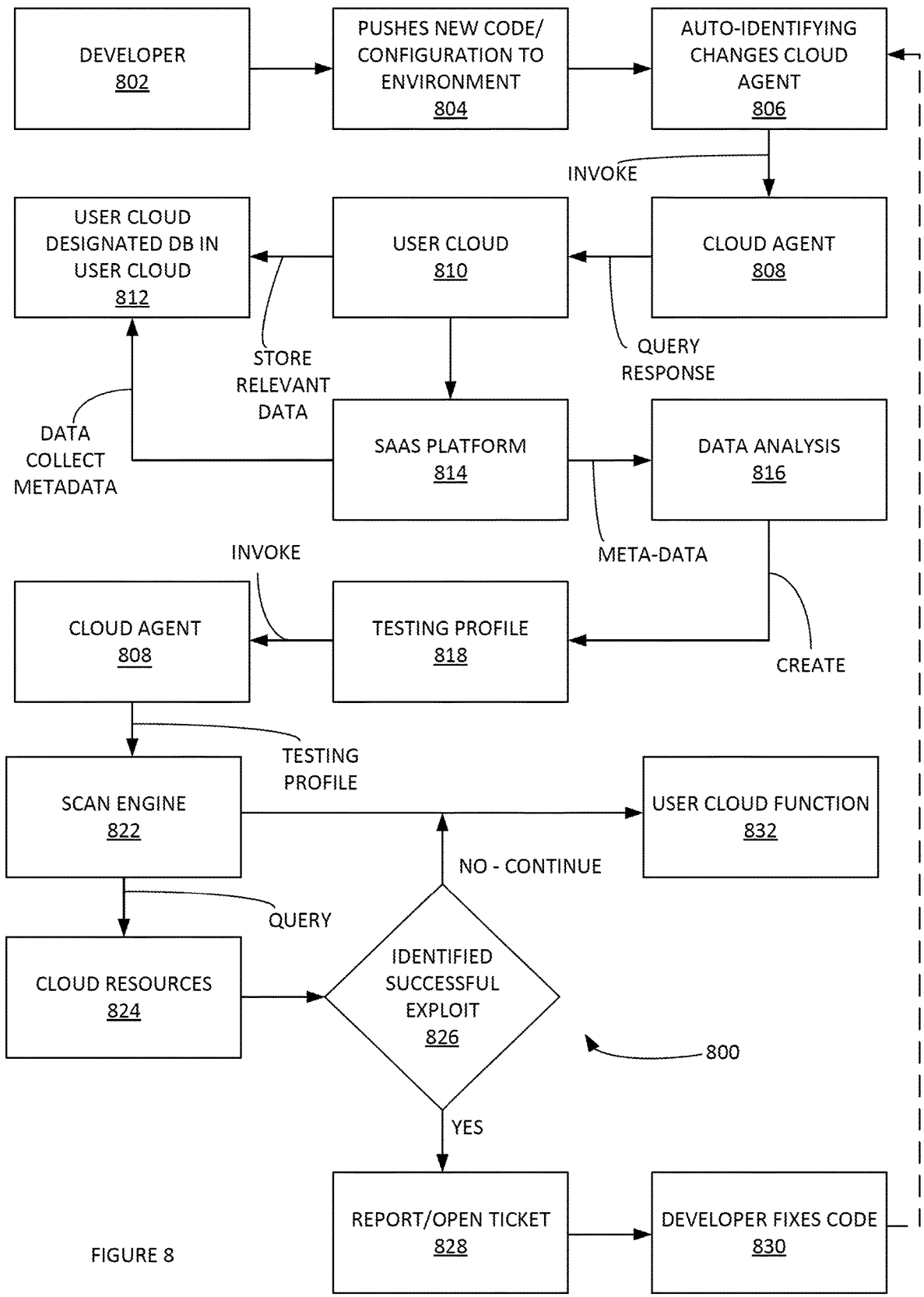
FIG. 8 illustrates an example process for autonomous application security testing, according to some embodiments.

FIG. 8 illustrates an example process 800 for autonomous application security testing, according to some embodiments. A developer 802 can use process 800 to push new code/configuration to a specified cloud-computing environment in step 804. Changes can be auto-identified. This can be done instead of a user requesting a scan as provided supra. In step 806, process 800 determines auto-identifying changes with cloud agent 808. Cloud agent 808 can provide a query response to user cloud 810 and store relevant data in a user cloud designated database in user cloud 812. SAAS platform 814 can collect relevant data and metadata from user cloud designated database in user cloud 812 and utilize it for data analysis in step 816. Data analysis can be used to create testing profile in step 818. Cloud agent 808 can then use a scan engine 822 to query cloud resources in step 824. Process 800 can determine if it has identified successful exploit in step 826. If yes, process 800 can generate report/open a ticket 828. In step 830 process 800 enables a developer to fix the code. Process 800 can return to 806. In no, then process 800 can implement a user cloud-function 832. Process 800 can be a continuous near-run time process.

Figure 9:
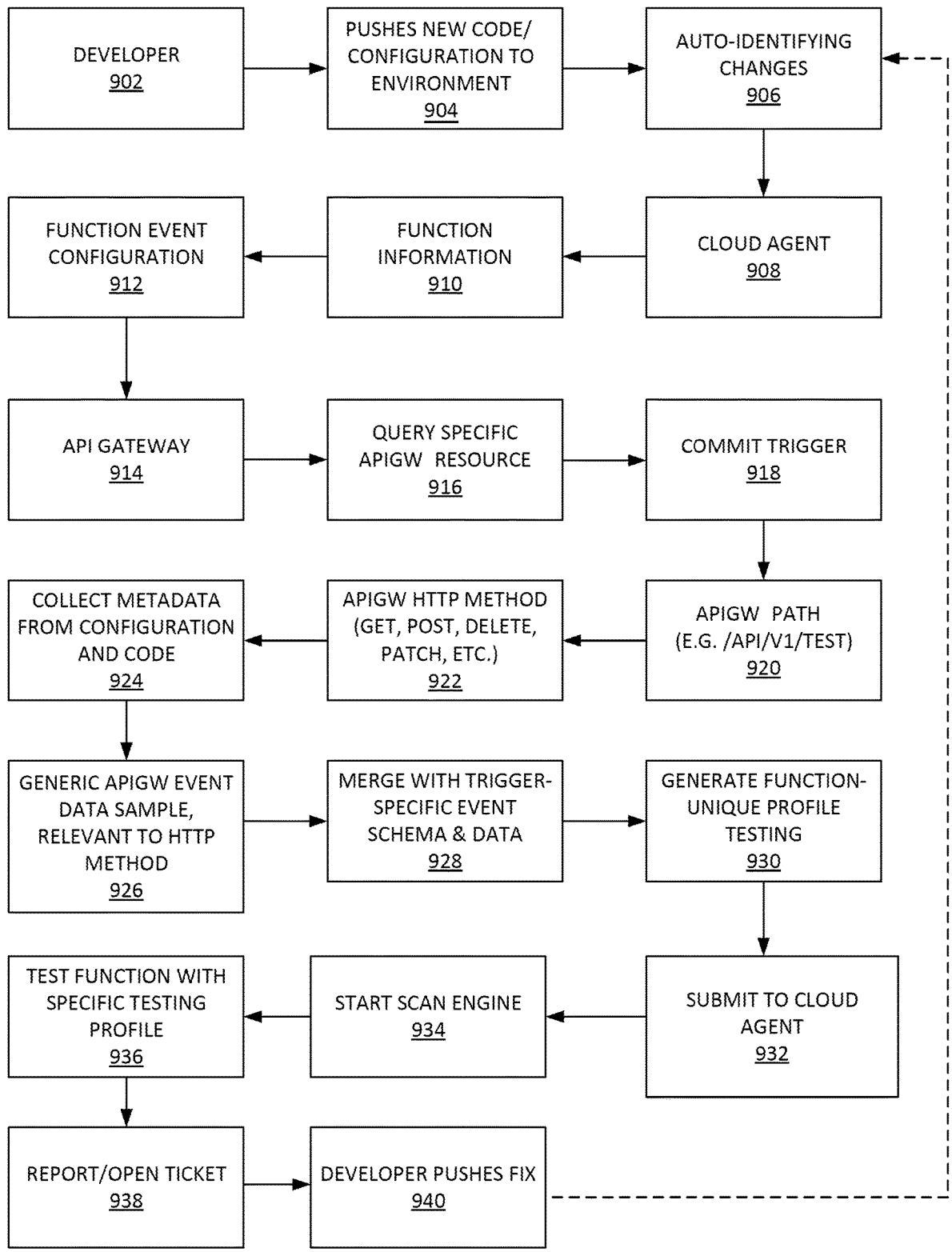
FIG. 9 illustrates an example process for autonomous application security testing, according to some embodiments.

FIG. 9 illustrates an example process 900 for autonomous application security testing, according to some embodiments. A developer 902 can use process 900 to push new code/configuration to a specified cloud-computing environment in step 904. In step 906, process 900 determines auto-identifying changes with cloud agent 908. Cloud agent 908 can provide a query response to user cloud 910 and store relevant data in a user cloud designated database in user cloud 912. Process 900 can query specific profile information via API gateway 914 in step 916.

A commit trigger 918 can be implemented and an APIGW path 920 utilized (e.g. /API/v1/test). An APIGW HTTP method (e.g. get, post, delete, patch, etc.) 922 can be utilized. Process 900 can collect metadata from configuration and code in step 924. Process 900 can provide/obtain a generic APIGW event data sample and data that is specifically relevant to HTTP method 926. Process 900 can merge these with trigger specific event schema and data 928. Process 900 can generate function unique profile testing 930. Process 900 can submit this to the cloud agent 932. Process 900 can start scan engine 934. Process 900 can implement a test function with specific testing profile 936. Process 900 can generate report/open a ticket 938. In step 940, process 900 enables a developer to fix the code. Process 900 can return to 906.

Figure 10:
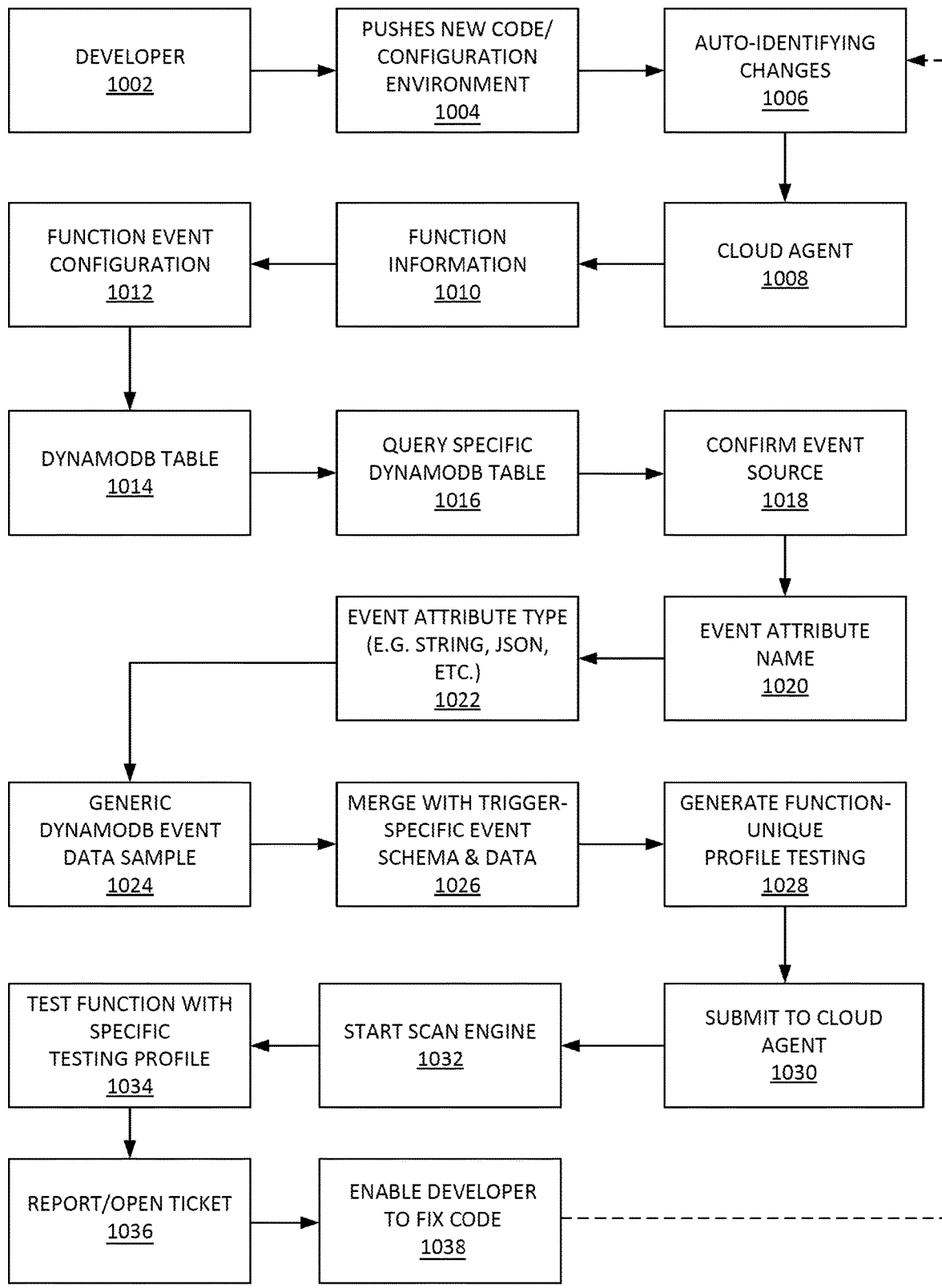
FIG. 10 illustrates an example process for autonomous application security testing with a Dynamo DB, according to some embodiments.

FIG. 10 illustrates an example process 1000 for autonomous application security testing with a Dynamo DB, according to some embodiments. A developer 1002 can use process 1000 to push new code/configuration to a specified cloud-computing environment in step 1004. In step 1006, process 1000 determines auto-identifying changes with cloud agent 1008. Cloud agent 1008 can be used to obtain the function information 1010 and function event configuration 1012. A Dynamo DB table can be generated in step 1014. Process 1000 can query the specific dynamo DB table in step 1016. Process 1000 can determine the event source 1018, event attribute name 1020 and event attribute type (e.g. string, JSON, etc.) 1022. Process 1000 can use this information to generate a generic dynamo DB event data sample 1024. This can be merged with a trigger specific event schema and data 1026. In step 1028, process 1000 can generate function unique profile for testing. In step 1030, process 1000 can submit this to cloud agent 1008. In step 1032, process 1000 can start the scan engine. In step 1034, process 1000 can implement a test function with the specific testing profile. Process 1000 can generate report/open a ticket 1036. In step 1040, process 1000 enables a developer to fix the code. Process 1000 can return to 1006.

Figure 11:
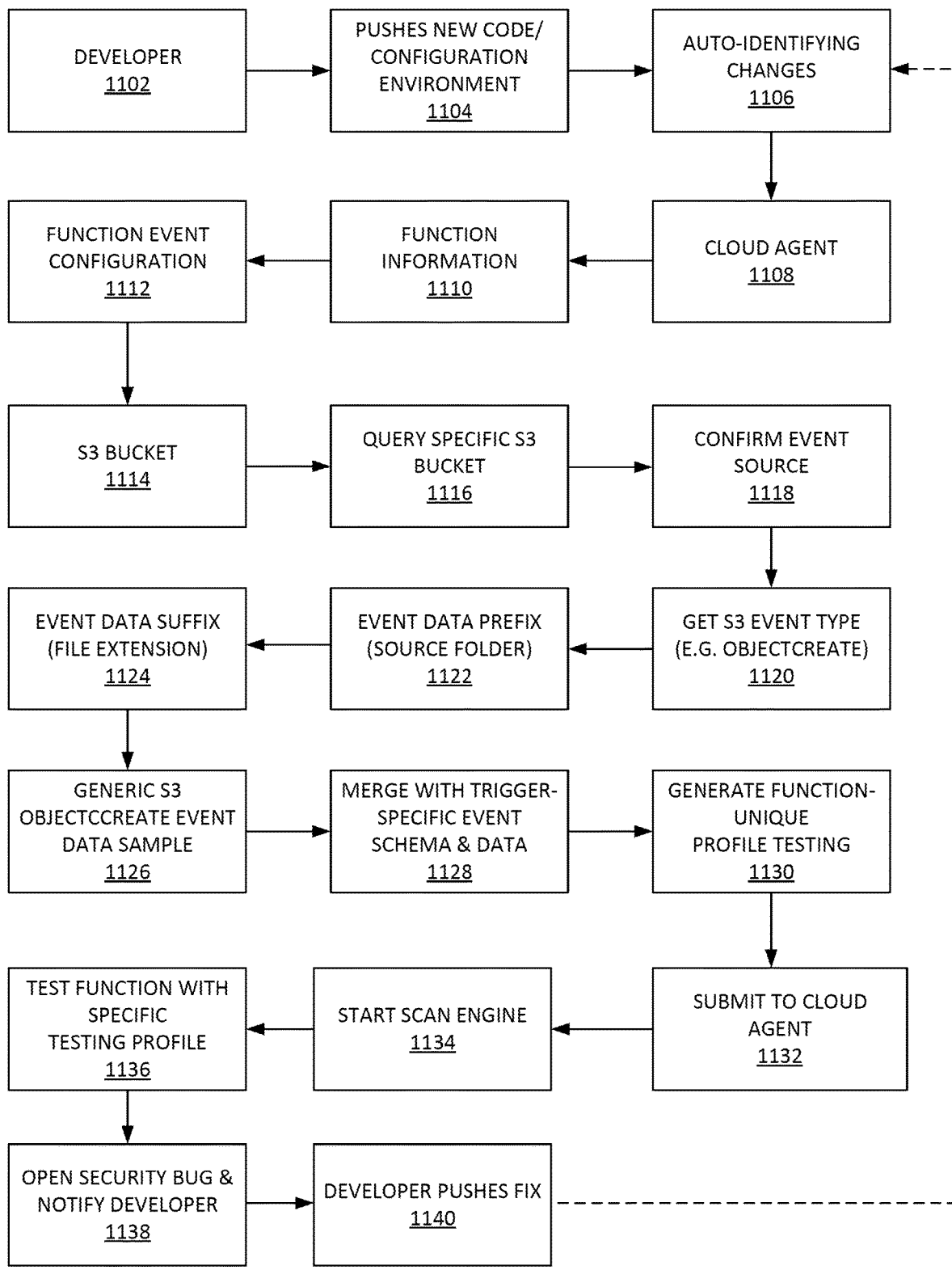
FIG. 11 illustrates an example process for autonomous application security testing with an S3 bucket, according to some embodiments.

FIG. 11 illustrates an example process 1100 for autonomous application security testing with an S3 bucket, according to some embodiments. A developer 1102 can use process 1100 to push new code/configuration to a specified cloud-computing environment in step 1104. In step 1106, process 1100 determines auto-identifying changes with cloud agent 1108. Cloud agent 1108 can be used to obtain the function information 1110 and function event configuration 1112.

A cloud-agent 1108 can be used to obtain the relevant metadata. This can be stored in an S3 bucket 1114. In step 1116, process 1100 can query specific S3 bucket. in step 1118, process 1100 can confirm event source. Process 1100 can obtain S3 event type (e.g. object create) in step 1120. An S3 event type can be an event that occurs in the storage that triggers the code. Process 1100 can obtain an event data prefix 1122 (e.g. a source folder, file extensions that are expected, etc.). Process 1100 can combine S3 bucket profile with a pre-defined data structure in step 1114. In step 1126, process 1100 can also use a generic S3 object to create event data sample 1126. In this way, the function can be tested with malicious content.

This can be merged with a trigger specific event schema and data 1128. In step 1130, process 1100 can generate function unique profile for testing. In step 1132, process 1100 can submit this to cloud agent 1108. In step 1134, process 1100 can start the scan engine. In step 1136, process 1100 can implement a test function with the specific testing profile previously developed.

Process 1100 can generate report/open a ticket 1138. In step 1140, process 1100 enables a developer to fix the code. Process 1100 can return to 1106.

Additional Example Computer Architecture and Systems

Figure 12:
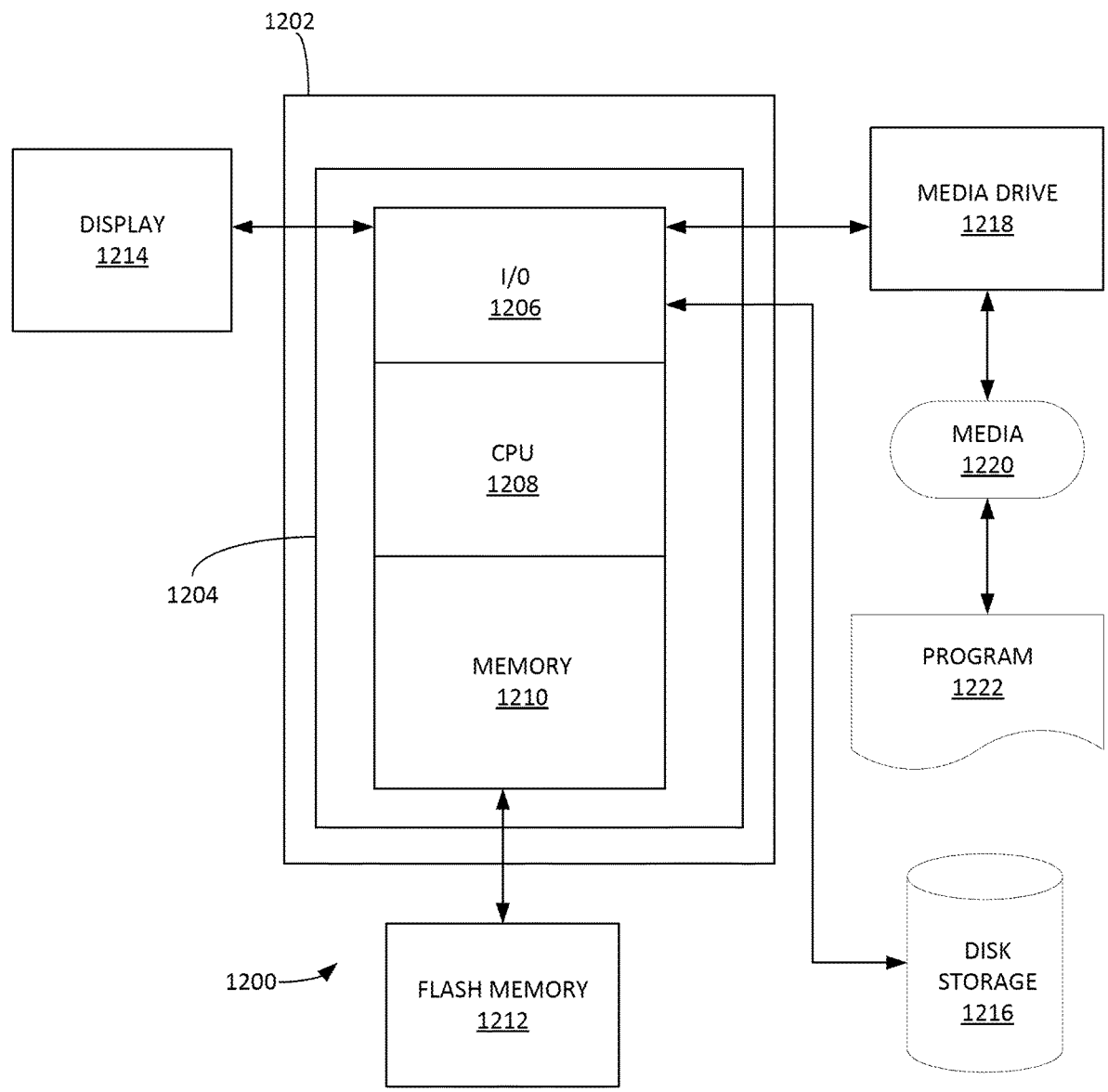
FIG. 12 is a block diagram of a sample computing environment that can be utilized to implement various embodiments.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, etc.

Referring now to FIGS. 1 through 12, example embodiments may include at least one user computing device 106 with a user interface. The user computing device 106 may include at least one processing unit coupled to a form of memory. The user computing device 106 may include, but not limited to, a microprocessor, a server, a desktop, laptop, and smart device, such as, a tablet and smart phone. The user computing device 106 includes a program product including a machine-readable program code for causing, when executed, the computer to perform steps. The program product may include software which may either be loaded onto the user computing device 106 or accessed by the user computing device 106. The loaded software may include an application on a smart device. The software may be accessed by the computer using a web browser. The user computing device 106 may access the software via the web browser using the internet, extranet, intranet, host server, internet cloud and the like.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task. User computing device 106 can include computing system 1200.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A method comprising:
   providing a cloud-platform based application;
   providing a manager Lambda function, wherein with the manager Lambda function:
      scans the cloud-platform based application, and wherein the cloud-platform based application comprises another Lambda function, and
      obtains a set of metadata about the cloud-platform based application, wherein the set of metadata comprises a set of permissions of the Lambda function, and an identity of a flow of the Lambda function;
      uses the set of metadata to generate a testing profile of the other Lambda function in a templated format based on a type of application of the cloud-platform based application; and
      uses the testing profile to exercise the cloud-platform based application with one or more security testing operations, and
   wherein the cloud-platform based application is installed in a user-side cloud computing platform,
   wherein the Lambda function comprises an Amazon Web Services Lambda function, wherein the Lambda function can be an anonymous computing function, not bound to an identity,
   wherein the manager Lambda function performs a set of intrusive operations from within the user-side cloud computing platform,
   wherein any sensitive information of the cloud-platform based application is not sent outside of the user-side cloud computing platform,
   scanning a Dynamo database to obtain the set of metadata, wherein the testing profile is in a Dynamo database templated format.

2. The method of claim 1, wherein the manager Lambda function comprises another Lambda function provided to operate within the user-side cloud computing platform.

3. The method of claim 2, wherein the manager Lambda function implements the application security testing Lambda functions from within the user-side cloud computing platform.

4. The method of claim 3, wherein the set of metadata comprises a set of services of the Lambda function, and an identity of an entity the Lambda function interacts with.

5. The method of claim 1, wherein the manager Lambda function:
scans an application programming interface gateway (APIGW) to obtain the set of metadata.

6. The method of claim 1, wherein the manager Lambda function:
scans an S3 bucket application to obtain the set of metadata.

7. The method of claim 6, wherein the testing profile is in an S3 bucket application templated format.

8. A method comprising:
providing a cloud-platform based application;
providing a manager Lambda function, wherein with the manager Lambda function:
scans the cloud-platform based application, and wherein the cloud-platform based application comprises another Lambda function, and
obtains a set of metadata about the cloud-platform based application, wherein the set of metadata comprises a set of permissions of the Lambda function, an identity of a flow of the Lambda function;
uses the set of metadata to generate a testing profile of the other Lambda function in a templated format based on a type of application of the cloud-platform based application; and
uses the testing profile to exercise the cloud-platform based application with one or more security testing operations, and
wherein the cloud-platform based application is installed in a user-side cloud computing platform,
wherein the Lambda function comprises an Amazon Web Services Lambda function, wherein the Lambda function can be an anonymous computing function, not bound to an identity,
wherein the manager Lambda function performs a set of intrusive operations from within the user-side cloud computing platform,
wherein any sensitive information of the cloud-platform based application is not sent outside of the user-side cloud computing platform,
scanning a Dynamo database to obtain the set of metadata, wherein the testing profile is in a Dynamo database templated format.

* * * * *